US005987968A

United States Patent [19]

Cook et al.

[11] Patent Number: 5,987,968

[45] Date of Patent: Nov. 23, 1999

[54] AUTOMOTIVE EVAPORATIVE EMISSION LEAK DETECTION SYSTEM MODULE

[75] Inventors: John Cook; Craig A. Weldon; Paul D. Perry, all of Chatham; Raymond Rasokas, Thamesville, all of Canada

[73] Assignee: Siemens Canada Limited, Mississauga, Canada

[21] Appl. No.: 09/037,783

[22] Filed: Mar. 10, 1998

Related U.S. Application Data

[60] Provisional application No. 60/057,962, Sep. 5, 1997, and provisional application No. 60/058,275, Sep. 9, 1997.

[51] Int. Cl.[6] .............................. G01M 3/20; F02M 37/04

[52] U.S. Cl. ........................... 73/49.7; 73/118.1; 123/520

[58] Field of Search ................................ 73/49.7, 40.5 R, 73/40, 118.1; 123/518, 519, 520, 521

[56] References Cited

U.S. PATENT DOCUMENTS

| | | | |
|---|---|---|---|
| 5,383,437 | 1/1995 | Cook et al. | 123/520 |
| 5,474,050 | 12/1995 | Cook et al. | 123/520 |
| 5,606,121 | 2/1997 | Blomquist et al. | 73/118.1 |
| 5,641,899 | 6/1997 | Blomquist et al. | 73/118.1 |
| 5,817,925 | 10/1998 | Cook et al. | 783/40 |

*Primary Examiner*—Michael Brock

[57] ABSTRACT

A module for an on-board evaporative emission leak detection system that detects leakage from an evaporative emission space of a fuel system of an automotive vehicle. A housing provides an inlet port, an outlet port, and a flow path between the inlet port and the outlet port. An electric-motor-operated impeller pump causes flow in one direction along the flow path when in a pumping mode of operation. The pump is open to flow in both the one direction and an opposite direction when in a non-pumping mode. A solenoid-operated valve is disposed in the flow path to block flow through the flow path when in a blocking mode and to pass flow through the flow path when in a passing mode. A pressure switch is exposed to the flow path at the outlet port. A lead frame assembly provides respective electric circuit connections to the motor, solenoid, and pressure switch.

19 Claims, 7 Drawing Sheets

AUTOMOTIVE EVAPORATIVE EMISSION LEAK DETECTION SYSTEM MODULE

REFERENCE TO RELATED APPLICATION AND PRIORITY CLAIM

This application expressly claims the benefit of earlier filing date and right of priority from the following co-pending patent applications: U.S. Provisional Application Ser. No. 60/057,962 filed on Sep. 5, 1997 in the names of Cook et al, entitled "Automotive Evaporative Emission Leak Detection System and Method," and Provisional Application Ser. No. 60/058,275 filed on Sep. 9, 1997 in the names of Cook et al., entitled "Evaporative Emission Leak Detection System;" each of which provisional patent application is expressly incorporated in its entirety by reference.

FIELD OF THE INVENTION

This invention relates generally to an on-board system for detecting fuel vapor leakage from an evaporative emission space of an automotive vehicle fuel system, relating particularly to an assembly, or module, for such a system. A module comprises at least a pump, a valve, and a sensor, and may optionally include a vapor collection medium.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

It is believed fair to say that there are two basic types of diagnostic systems and methods for determining integrity of an evaporative emission space against leakage.

Commonly owned U.S. Pat. No. 5,146,902 "Positive Pressure Canister Purge System Integrity Confirmation" discloses one type: namely, a system and method for making a leakage determination by pressurizing the evaporative emission space to a certain positive pressure therein (the word "positive" meaning relative to ambient atmospheric pressure) and then watching for a drop in positive pressure indicative of a leak.

Commonly owned U.S. Pat. No. 5,383,437 discloses the use of a reciprocating pump to create test pressure in the evaporative emission space. A reed switch is disposed to sense reciprocation of the pump mechanism, and serves both to cause the pump mechanism to reciprocate at the end of a compression stroke and as an indication of how fast air is being pumped into the evaporative emission space. The frequency of switch operation provides a measurement of leakage that can be used to distinguish between integrity and non-integrity of the evaporative emission space.

Commonly owned U.S. Pat. No. 5,474,050 embodies advantages of the pump of U.S. Pat. No. 5,383,437 while providing certain improvements in the organization and arrangement of that general type of pump. More specifically, the pump of U.S. Pat. No. 5,474,050: enables integrity confirmation to be made while the engine is running; enables integrity confirmation to be made over a wide range of fuel tank fills between full and empty so that the procedure is for the most part independent of tank size and fill level; provides a procedure that is largely independent of the particular type of volatile fuel being used; provides the pump with novel internal valving for selectively communicating the air pumping chamber space, a first port leading to the evaporative emission space, and a second port leading to atmosphere; and provides a reliable, cost-effective means for compliance with on-board diagnostic requirements for assuring leakage integrity of an evaporative emission control system.

The other of the two general types of systems for making a leakage determination does so by creating in the evaporative emission space a certain negative pressure (the word "negative" meaning relative to ambient atmospheric pressure so as to denote vacuum) and then watching for a loss of vacuum indicative of a leak. A known procedure employed by this latter type of system in connection with a diagnostic test comprises utilizing engine manifold vacuum to create vacuum in the evaporative emission space. Because that space may, at certain non-test times, be vented through the canister to allow vapors to be efficiently purged when the CPS valve is opened for purging fuel vapors from the tank headspace and canister, it is known to communicate the canister vent port to atmosphere through a vent valve that is open when vapors are being purged to the engine, but that closes preparatory to a diagnostic test so that a desired test vacuum can be drawn in the evaporative emission space for the test. Once a desired vacuum has been drawn, the purge valve is closed, and leakage appears as a loss of vacuum during the length of the test time after the purge valve has been operated closed.

In order for an engine management computer to ascertain when a desired vacuum has been drawn so that it can command the purge valve to close, and for loss of vacuum to thereafter be detected, it is known to employ an electric sensor, or transducer, that measures negative pressure, i.e. vacuum, in the evaporative emission space by supplying a measurement signal to the engine management computer. It is known to mount such a sensor on the vehicle's fuel tank where it will be exposed to the tank headspace. For example, commonly owned U.S. Pat. No. 5,267,470 discloses a pressure sensor mounting in conjunction with a fuel tank roll-over valve.

SUMMARY OF THE INVENTION

One generic aspect of the present invention relates to a module for an on-board evaporative emission leak detection system that detects leakage from an evaporative emission space of a fuel system of an automotive vehicle, the module comprising: a housing comprising an inlet port, an outlet port, a flow path between the inlet port and the outlet port, and a receptacle; a prime mover for moving gaseous fluid through the flow path; a selectively operable valve assembly disposed within the housing operable to a first condition for allowing gaseous fluid to move through the flow path and to a second condition for disallowing gaseous fluid from moving through the flow path; and wherein the receptacle locates a portion of the valve assembly within the housing and cooperates with that portion of the valve assembly to cooperatively define a portion of the flow path. Another generic aspect of the present invention relates to a module for an on-board evaporative emission leak detection system that detects leakage from an evaporative emission space of a fuel system of an automotive vehicle, the module comprising: a housing having an inlet port, an outlet port, a flow path extending between the inlet port and the outlet port, and plural walled receptacle spaces; a selectively operable pump mechanism that is disposed in the flow path; a selectively operable valve mechanism that is disposed in the flow path; a respective electric device for operating a respective one of the mechanisms, the electric device for the pump mechanism being disposed within a first walled receptacle space, and the electric device for the valve mechanism being disposed within a second walled receptacle space; the housing comprising plural housing parts that are in assembly relationship to enclose the pump and valve mechanisms within the housing; and a portion of the length of the flow path being defined cooperatively by a portion of the electric device for one of the mechanisms and a wall of the corresponding walled receptacle space.

Still another generic aspect of the present invention relates to a module for an on-board evaporative emission leak detection system that detects leakage from an evaporative emission space of a fuel system of an automotive vehicle comprising: a housing comprising an inlet port, an outlet port, and a flow path extending from the inlet port to the outlet port; a medium that is disposed within the housing to demarcate a clean air segment of the flow path from a dirty air segment of the flow path; a selectively operable pump for pumping gaseous fluid through the flow path in a pumping mode of operation; a selectively operable valve for blocking flow through the flow path when in a blocking mode and for passing flow through the flow path when in a passing mode; and the dirty air segment of the flow path being in common with the outlet port, and the clean air segment of the flow path being in common with the inlet port.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

DESCRIPTION OF THE PREFERRED EMBODIMENT

Figures 1, 2:
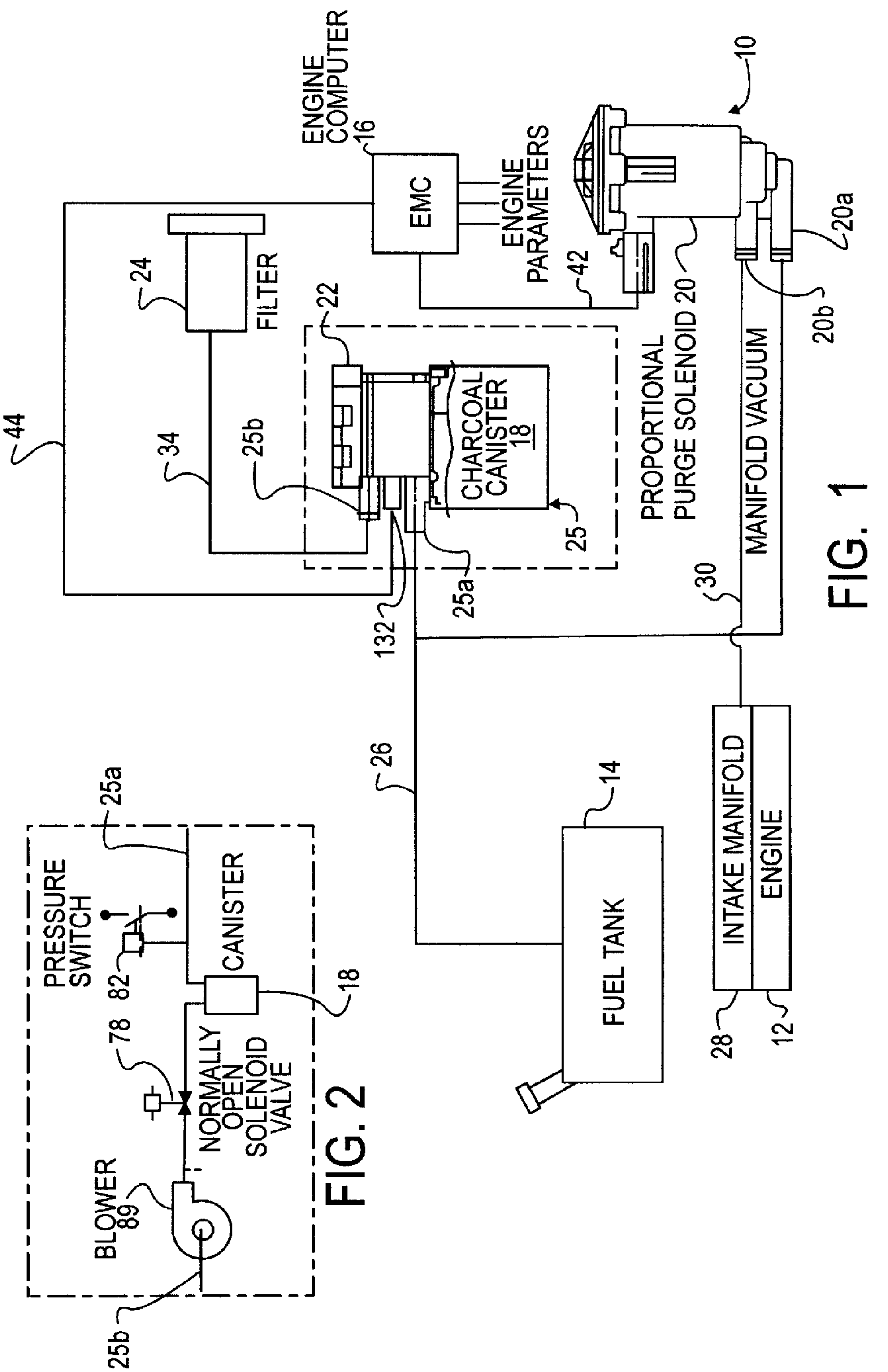
FIG. 1 is a general schematic diagram of an automotive vehicle evaporative emission control system including a leak detection system having a leak detection module embodying principles of the invention.
FIG. 2 is a more detailed schematic diagram of an exemplary leak detection module as in FIG. 1, shown in association with a vapor collection canister.

FIG. 1 shows an automotive vehicle evaporative emission control (EEC) system 10 in association with an internal combustion engine 12 that powers the vehicle, a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, a proportional purge solenoid (PPS) valve 20, a leak detection module (LDM) 22, and a particulate filter 24. In the illustrated embodiment, LDM 22 and canister 18 are shown as an integrated assembly, or module, 25.

Headspace of fuel tank 14, a port **25*a* of module 25, and an inlet port 20*a* of PPS valve 20 are placed in common fluid communication by a conduit 26 so that the tank headspace and the canister cooperatively define evaporative emission space within which fuel vapors generated by volatilization of fuel in tank 14 are temporarily confined and collected until purged to an intake manifold 28 of engine 12. Another conduit 30 fluid-connects an outlet port 20*b* of PPS valve 20 with intake manifold 28. Another conduit 34 fluid-connects a port 25*b* of module 25 to atmosphere via filter 24**.

EMC 16 receives a number of inputs (engine-related parameters for example) relevant to control of certain operations of engine 12 and its associated systems, including EEC system 10. One electrical output port of EMC 16 controls PPS valve 20 via an electrical connection 42; other ports of EMC 16 are coupled with module 25 via electrical connections, depicted generally by the reference numeral 44 in FIG. 1.

From time to time, EMC 16 commands LDM 22 to an active state as part of an occasional leak detection test procedure for ascertaining the integrity of EEC system 10, particularly the evaporative emission space that contains volatile fuel vapors, against leakage. During occurrences of such a diagnostic procedure, EMC 16 commands PPS valve 20 to close. At times of engine running other than during such leak detection procedures, LDM 22 reposes in an inactive state, and in doing so provides an open vent path from the evaporative emission space, through module 25 and filter 24, to atmosphere. A vapor adsorptive medium within canister 18 prevents escape of fuel vapor to atmosphere during such venting.

EMC 16 selectively operates PPS valve 20 such that the valve opens under conditions conducive to purging and closes under conditions not conducive to purging. Thus, during times of operation of the automotive vehicle, the canister purge function is performed in a known manner for the particular vehicle and engine so long as the leak detection test procedure is not being performed. When the leak detection test procedure is being performed, the canister purge function is not performed. During a leak detection test, the evaporative emission space is isolated from both atmosphere and the engine intake manifold so that it can be initially pressurized by LDM 22, and the pressure thereafter allowed to decay if leakage is present.

Structural detail of LDM 22 is presented by FIGS. 3–8 inclusive while FIG. 2 depicts the flow path that is provided by such structure.

LDM 22 comprises a housing 56 composed of several parts, including parts 56*a*, 56*b*, 56*c* assembled together. These housing parts are preferably fabricated from suitable fuel-resistant plastic. Housing 56 may be described generally to comprise a cylindrical enclosure, although not necessarily circular nor of uniform cross section throughout. Part 56*a* is an upper end cap that is fitted at a fluid-tight joint 57 to one axial end of part 56*b*, the latter being a main body part of housing 56. Main body 56*b* is partitioned by a transverse wall 72 spaced from end cap 56*a*. These two assembled parts cooperatively define and enclose an internal chamber space 68. Part 56*c* is shown to be an integral formation of an upper end wall of a housing of canister 18, the latter being joined at a fluid-tight joint 59 to the lower axial end of main body 56*b*.

Figure 3:
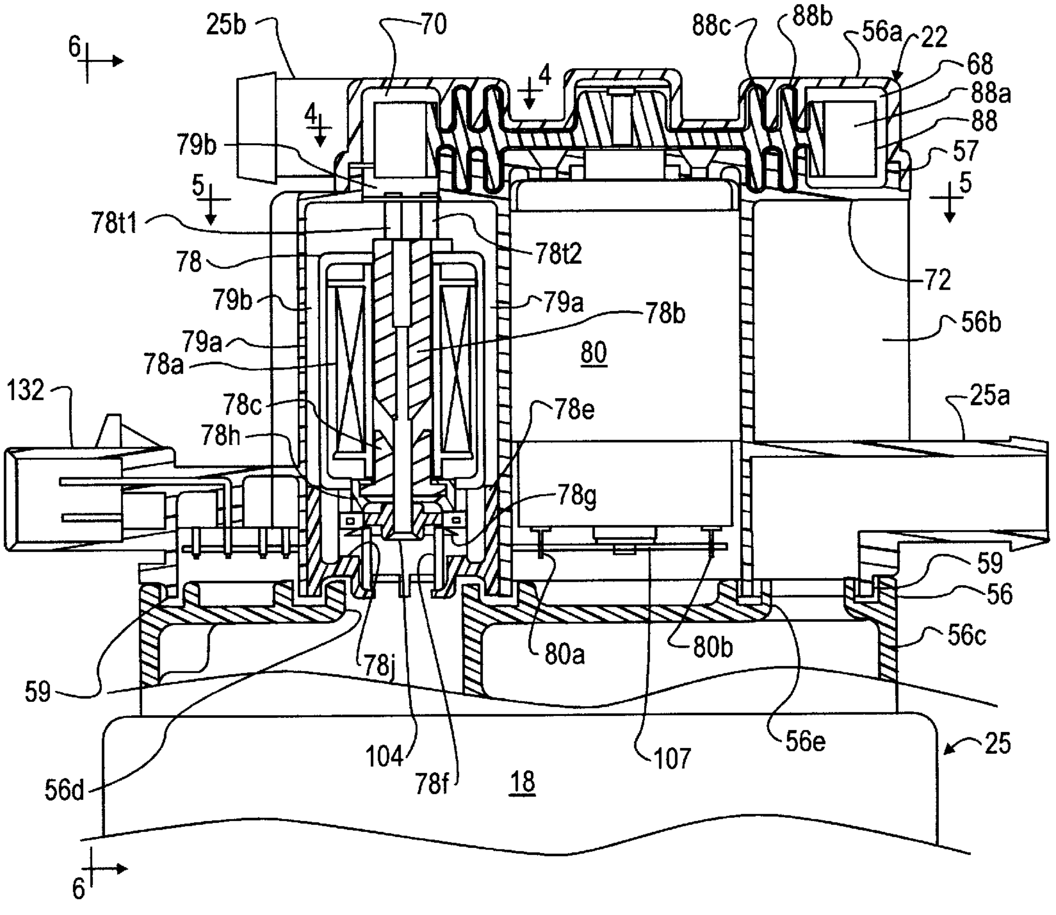
FIG. 3 is an elevation view, partly in cross section, through an exemplary canister-mounted leak detection module.
Figure 4:
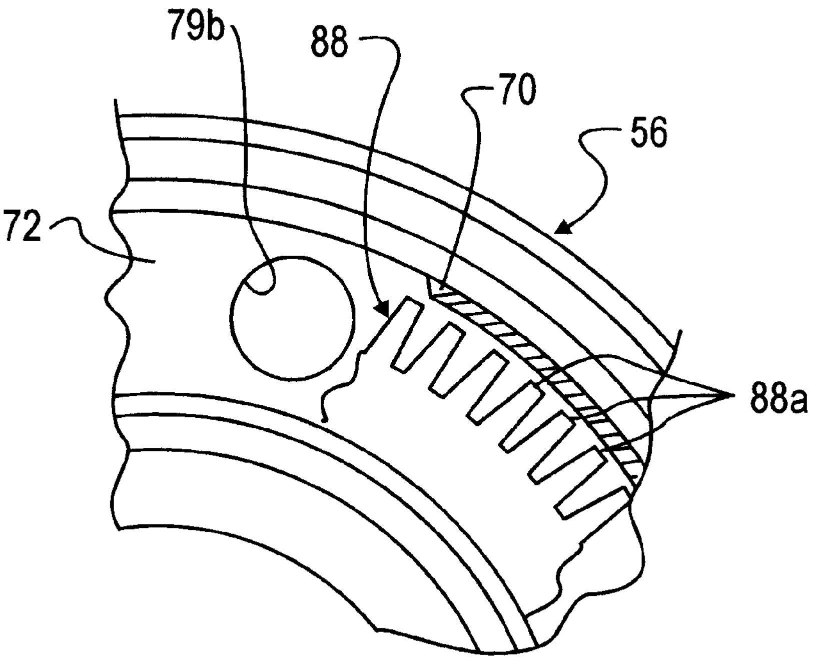
FIG. 4 is a fragmentary cross-section view generally transverse to the view of FIG. 3, taken in the general direction of arrows 4—4 in the latter FIG.

Chamber space 68 is communicated to filter 24 via port 25*b*, which is illustratively disclosed as a nipple over which one end of conduit 34 can be fitted in gas-tight fashion. Solely to facilitate the reader's understanding, FIG. 3 illustrates the nipple that forms port 25*b* out of true position, the true position being depicted in FIGS. 6, 7, and 8.

Disposed within housing 56 are: a solenoid-operated valve 78; an electric motor 80, a D.C. motor in the disclosed embodiment for use with an automotive vehicle D.C. electric system; and an electric sensor 82 for supplying an electric signal related to a fuel vapor parameter, the disclosed embodiment being a pressure switch that supplies a signal related to vapor pressure to EMC 16.

Proximate the center of wall 72 is a hole that allows a shaft of motor 80 to protrude through the wall into chamber space 68 without interference. In order to avoid leakage through this hole, any suitable sealing means may be provided as required between the motor casing and the portion of wall 72 around the hole. Attachment of the motor casing to housing 56 may be made by fastening the casing to wall 72.

A pumping mechanism comprises an impeller 88 disposed within chamber space 68 and secured to the motor shaft for rotation about the motor axis when motor 80 is operated. Impeller 88 comprises a number of vanes, or blades, 88*a* that are supported around its outer perimeter, much as in a paddle wheel. Radially inward of vanes 88*a*, impeller 88 has an integral first cylindrical ring 88*b* and an integral second cylindrical ring 88*c* each of which extends to both axial sides of the impeller. Wall 72 and housing end cap 56*a* have respective pairs of circular grooves. Each pair of grooves coacts with corresponding axial ends of rings 88*b* and 88*c* to form a circular aerodynamic, or labyrinth, seal to the radially inward side of vanes 88*a* when impeller 88 is operated by motor 80. Thus, the impeller vanes are disposed within an annular space bounded radially by the labyrinth seal and a portion of the housing side wall respectively, and axially by end cap 56*a* and wall 72 respectively. The radially outer edges of the vanes lie on a circle that is spaced radially inward of the circumferentially surrounding portion of the side wall of housing 56, which has a nominally circular shape, except at a pinch point 70 (FIGS. 3 and 4) where the side wall protrudes radially inward. The vaned outer perimeter of impeller 88 may be considered to have opposite axial faces. One axial face confronts an opposing wall of end cap 56*a* while a portion of the opposite face confronts wall 72.

Pinch point 70 comes sufficiently close to the vaned portion of impeller 88 at a particular circumferential location, but without interference with the impeller, so as to create an air dam when impeller 88 is operated by motor 80. This air dam is located relative to port 25*b* and the entrance of an internal passage 79*b* (hereinafter more fully described) such that operation of impeller 88 by motor 80 is effective to draw air through port 25*b* and into chamber space 68, and thence impel the air into that passage 79*b*. This construction forms a variable displacement pump for pumping gaseous fluid, i.e. a blower, that is designated by reference numeral 89 in FIG. 2.

A pressure switch that has a certain pre-defined hysteresis in its switching characteristic is particularly well-suited for use as sensor 82. Such a sensor comprises a body 82*a* having a first pressure sensing zone communicated to port 25*b* by a conduit 82*b*, shown in FIGS. 6 and 7. Sensor 82 has a second pressure sensing zone communicated by a conduit 82*c* to the same portion of canister 18 to which port 25*a* is communicated. Sensor 82 assumes a first switch state (open for example) so long as the pressure difference between its two sensing zones is less than a certain magnitude. When that magnitude is exceeded, the sensor operates to a second switch state (closed for example). The sensor possesses a certain hysteresis in its switching characteristic whereby it will switch back to its first state only when the magnitude of the pressure difference between its two sensing zones returns to a certain magnitude that is smaller by a predetermined amount than the magnitude at which it switched from its first state to its second state.

Solenoid-operated valve 78 has a generally cylindrical shape for fitting securely within a mounting on the interior of housing 56. This mounting comprises a cylindrical walled, internal receptacle space 79 having several circumferentially spaced apart, axially extending ribs 79*a* on the radially inner surface of cylindrical wall. These ribs serve to snugly locate the solenoid portion of valve 78 centrally within receptacle space 79, while cooperating with the valve to define passage 79*b* as axial channels running along the exterior of the solenoid portion. Passage 79*b* places chamber space 68 in fluid communication with the interior of a cup-shaped seat element 78*e* that is mounted within the interior of housing 56 coaxial with receptacle space 79 at an end opposite chamber space 68.

Valve 78 comprises a bobbin-mounted electromagnetic coil 78*a* and an associated stator structure composed of several ferromagnetic parts, including a stator part 78*c*, to form a portion of the solenoid's magnetic circuit. A cylindrical ferromagnetic armature 78*b* cooperates with stator structure to complete the magnetic circuit via air gaps between the stator structure and the armature. Armature 78*b* is arranged coaxial with a main axis of the solenoid valve and is guided for straight line motion along that axis within the bobbin that contains coil 78*a*. As shown by FIG. 3, the confronting, complementary tapered, axial ends of armature 78*b* and stator part 78*c* are separated by an air gap of the magnetic circuit.

Valve 78 further comprises a mechanism which includes a non-ferromagnetic valve element 104 having a circularshaped head and a cylindrical stem for attachment to armature 78b. Seat element 78e includes several formations disposed around a central through-hole therein which provide a seat for seating one end of a helical coiled compression spring 78f. The other end of spring 78f is centered on the face of the valve head, fitting over a boss formed in the valve head face. The valve head contains an annular one-piece lip seal 78g. Spring 78f continuously biases the valve head away from seat element 78e and toward a stop 78h so that the solenoid valve is normally open.

In normally open condition, the through-hole in valve seat element 78e places passage 79b in fluid communication with the "clean air" side of vapor adsorbent medium within canister 18. FIG. 3 shows the through-hole in valve seat element 78e in registry with a hole 56d in part 56c. The "dirty air" side of the vapor adsorbent medium within canister 18 is in continuous communication with port 25a via a hole 56e in part 56c that registers with an interior end of the nipple forming port 25a. Hence, when valve 78 is not being energized, the earlier-mentioned vent path to atmosphere through module 25 is open because there is no significant flow restriction between ports 25a and 25b. FIG. 2 schematically depicts the organization and arrangement of blower 89, valve 78, canister 18, and sensor 82 in the flow path. It can be seen that blower 89 and valve 78 are on the clean air side while sensor 82 is on the dirty air side.

When valve 78 is energized, the vent path to atmosphere is closed. Energization of coil 78a forces valve element 104 to close the through-hole in seat element 78e, seating the lip of lip seal 78g on a seat surface 78j of seat element 78e, and thereby block communication between port 25a and chamber space 68.

A lead frame assembly 107 within housing 56 provides for valve 78, electric motor 80, and sensor 82 to be electrically connected with external portions of associated electric circuitry that includes EMC 16. Assembly 107 terminates at a connector 132 that is externally accessible on module 25 for mating connection with a complementary connector (not shown) that leads to the associated electric circuitry. Two leads 107a, 107b are embedded in a wall of housing 56. At one end, leads 107a, 107b are bent to form terminals for mating with terminals 78t1, 78t2 of valve 78. At their opposite ends, leads 107a, 107b mate with terminals of lead frame assembly 107. Assembly 107 also has respective leads 107c, 107d that connect to respective terminals 80a, 80b of motor 80, and respective leads 107e, 107f that connect to respective terminals 82x, 82y of sensor 82.

It should be noticed in FIGS. 3, 6, 7, and 8 that the respective walled receptacle spaces for valve 78, motor 80, and sensor 82 in main body 56b are open at their lower ends to allow for assembly of these three parts into main body 56b during fabrication of module 25. Once such part placements have been made, part 56c can be assembled to main body 56b. After motor placement within its receptacle, impeller 88 can be fastened to the motor shaft and end cap 56a assembled to main body 56b. Joining of the housing parts may be accomplished by any suitable means, such by providing part 56b with a flange containing holes 56h through which fasteners (not shown) can be passed to assemble parts 56b and 56c together.

When no leak detection test is being performed, PPS valve 20 is operated by EMC 16 to periodically purge vapors from canister 18 and the tank headspace to engine 12. The exact scheduling of such purging is controlled by the vehicle manufacturer's requirements. During non-test times the vent path to atmosphere is open through module 25 and filter 24 so that the evaporative emission space is communicated to atmosphere, keeping the evaporative emission space generally at atmospheric pressure.

Figure 9:
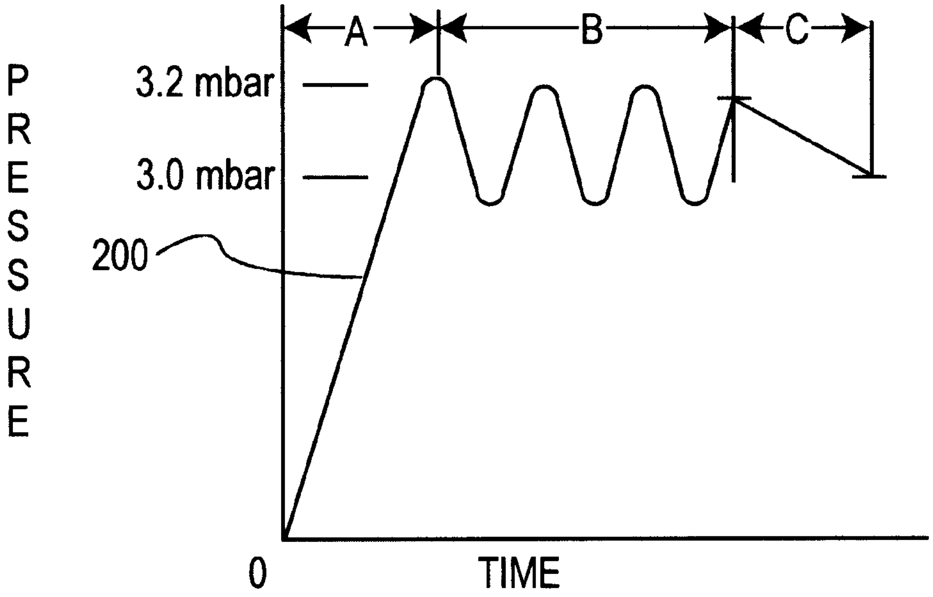
FIG. 9 is a representative graph plot useful in explaining a test conducted with a module embodying principles of the invention.

Preparatory to performing a leak detection test on EEC system 10, PPS valve 20 is operated closed by EMC 16. EMC 16 also commands operation of motor 80 to rotate impeller 88. Valve 78 remains de-energized, causing the internal flow path between ports 25a and 25b to be open. The operation of impeller 88 by motor 80 begins building pressure in the evaporative emission space comprising headspace of tank 14, canister 18, and any spaces, such as associated conduits, that are in communication therewith. Naturally all closures, such as the vehicle tank filler cap, must be in place to close the evaporative emission space under test except for the air being pumped into it via module 25. By being exposed to port 25a, the second sensing zone of sensor 82 is exposed to a pressure representative of the pressure in the evaporative emission space under test. Time intervals A and B in FIG. 9 depict the, pressurization, or initialization, phase. That phase is followed by the leak detection test commencing at the beginning of time interval C at which time valve 78 is operated closed and blower 89 throttled down to the extent of complete shut-off. Because PPS valve 20 has been closed during time intervals A and B, the closure of valve 78 results in isolation of the evaporative emission space from both atmosphere and the engine. Leakage from the evaporative emission space will cause the pressure to begin dropping, as represented by the portion of graph plot 200 during time interval C. At the beginning of time interval C, EMC 16 commences timing. The time required for decay of the evaporative emission space pressure to a level that causes sensor 82 to revert to its first state can be used to calculate the extent of leakage. If, within a predefined amount of time, the pressure does not decay enough to cause sensor 82 to revert to its first state, the extent of leakage, if any, may be deemed to fall within an acceptable range indicative of system compliance with relevant regulations. Detailed examples of test algorithms that can be performed using a module embodying the inventive principles disclosed herein are found in commonly assigned, co-pending patent non-provisional U.S. applications; application Ser. No. 09/037,785, filed Mar. 10, 1998, entitied "Automotive Evaporative Emission Leak Detection System Method," and application Ser. No. 09/037,784, filed Mar. 10, 1998, entitled "Initialization Method For An Automotive Evaporative Emission Leak Detection System," each of which patent application is expressly incorporated in its entirety by reference.

LDM 22 possesses a number of important advantages. Use of module 25 in an evaporative emission control system reduces the number of connections, both electrical and fluid, that are required for its installation in a new vehicle in a vehicle assembly plant. Accordingly, less in-plant labor time is needed. Moreover, reliability is improved because fewer connections reduces the probability of a faulty connection with another system component. LDM is well-suited for mass-production fabrication, including the use of automated assembly techniques, thereby providing for cost-effective manufacture.

Figure 5:
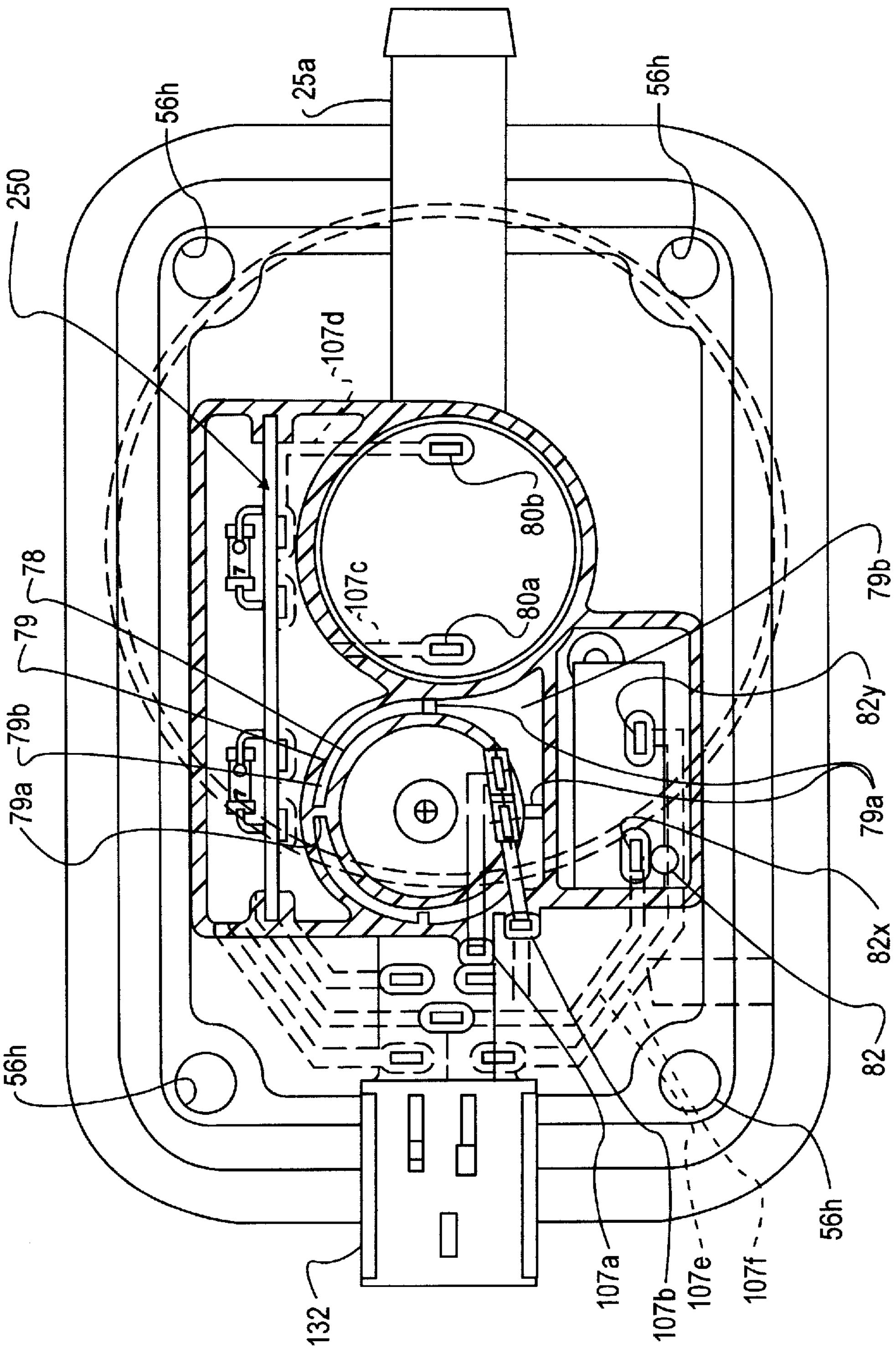
FIG. 5 cross-section view in the general direction of arrows 5—5 in FIG. 4 on an enlarged scale.
Figure 6:
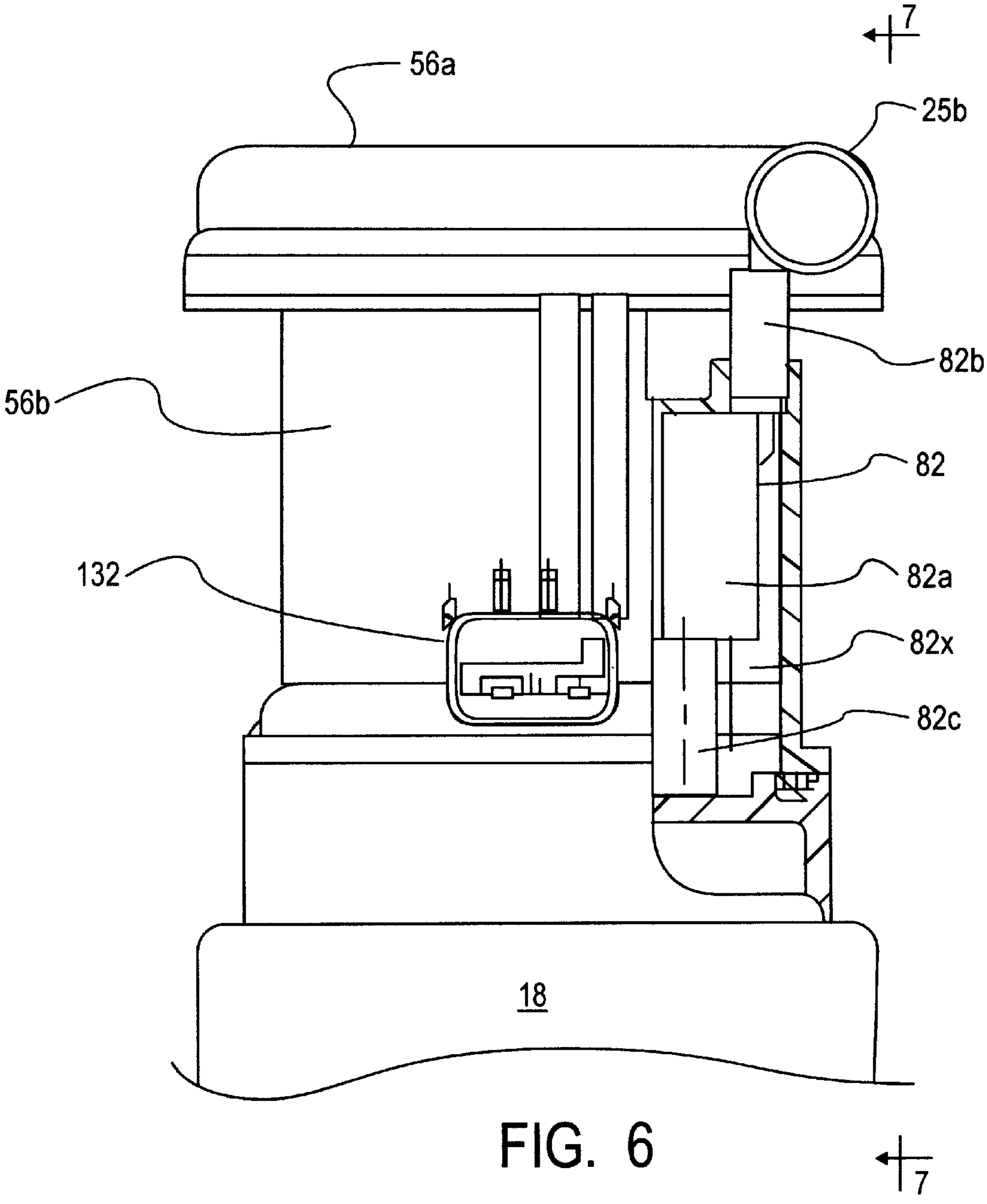
FIG. 6 is a view, having a portion broken away, in the direction of arrows 6—6 in FIG. 4 on a reduced scale.
Figure 7:
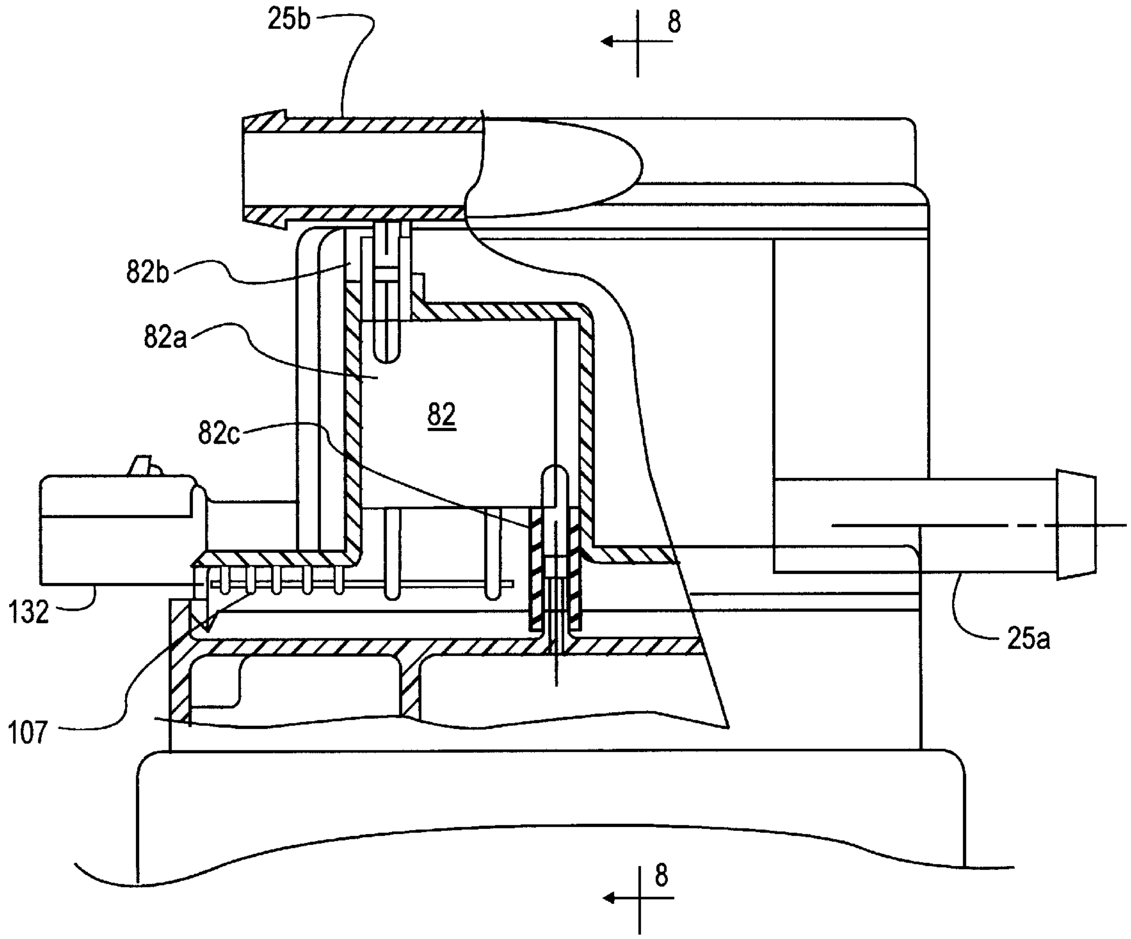
FIG. 7 is a view, having a portion broken away, in the direction of arrows 7—7 in FIG. 6.
Figure 8:
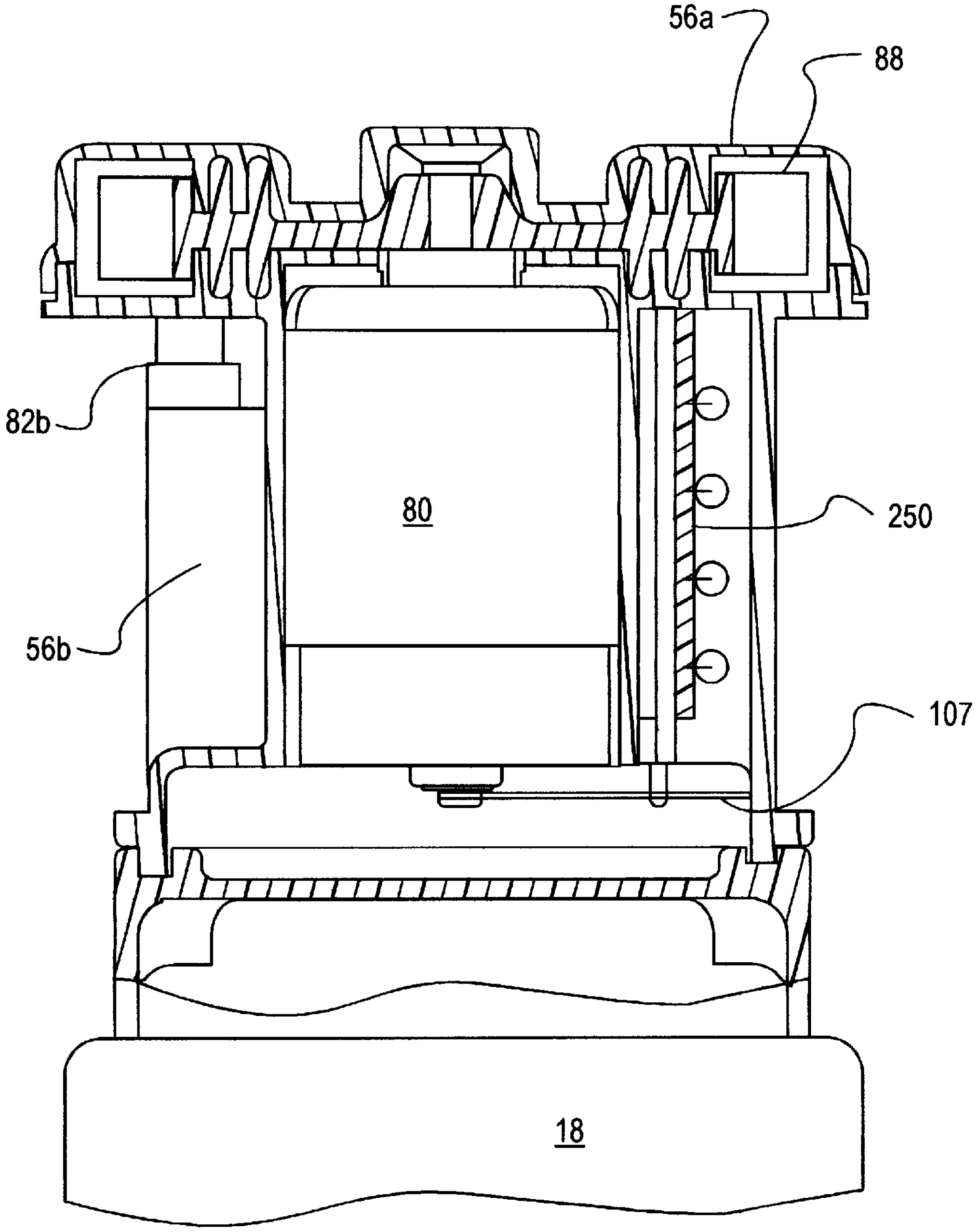
FIG. 8 is a view, having a portion broken away, in the direction of arrows 8—8 in FIG. 7.

While the foregoing description contemplates that module 25 and EMC 16 "talk" to each other at the initiation, during, and at the end of a diagnostic procedure, a circuit board assembly, such as the one 250 in FIGS. 5 and 6, may comprise a microprocessor and related circuitry that is programmed with a complete diagnostic algorithm. It can be see that edges of assembly 250 slide into mounting slots in the housing, enabling it to connect certain of its circuits with certain leads of lead frame assembly 107.

While a presently preferred embodiment of the invention has been illustrated and described, it should be appreciated that principles are applicable to other embodiments that fall within the scope of the following claims.

What is claimed is:

1. An on-board evaporative emission leak detection module for detecting leakage from an evaporative emission space of a fuel system of an automotive vehicle, the module comprising:

a housing comprising an inlet port, an outlet port, a flow path between the inlet port and the outlet port, and a receptacle;

a prime mover for moving gaseous fluid through the flow path;

a selectively operable valve assembly, including an electric actuator, disposed within the housing operable to a first condition for allowing gaseous fluid to move through the flow path and to a second condition for disallowing gaseous fluid from moving through the flow path; and wherein the receptacle locates the electric actuator of the valve assembly within the housing and cooperates with the electric actuator of the valve assembly to cooperatively define a portion of the flow path which runs axially along the electric actuator.

2. An on-board evaporative emission leak detection module for detecting leakage from an evaporative emission space of a fuel system of an automotive vehicle, the module comprising:

a housing comprising an inlet port, an outlet port, a flow path between the inlet port and the outlet port, and a walled receptacle;

a prime mover for moving gaseous fluid through the flow path;

a selectively operable valve assembly disposed within the housing operable to a first condition for allowing gaseous fluid to move through the flow path and to a second condition for disallowing gaseous fluid from moving through the flow path;

wherein the receptacle locates a portion of the valve assembly within the housing and cooperates with that portion of the valve assembly to cooperatively define a portion of the flow path; and in which the portion of the valve assembly has a generally cylindrical shape and the walled receptacle comprises at least two circumferentially spaced apart, axially extending ribs that locate the portion of the valve assembly within the walled receptacle space and that define at least one axially extending channel forming the portion of the length of the flow path.

3. A module as set forth in claim 2 in which the portion of the valve assembly comprises a solenoid.

4. A module as set forth in claim 2 in which the valve assembly further comprises a separate valve seat element disposed and located within the housing.

5. An on-board evaporative emission leak detection module for detecting leakage from an evaporative emission space of a fuel system of an automotive vehicle, the module comprising:

a housing having an inlet port, an outlet port, a flow path extending between the inlet port and the outlet port, and plural walled receptacle spaces;

a selectively operable pump mechanism that is disposed in the flow path;

a selectively operable valve mechanism that is disposed in the flow path;

a respective electric device for operating a respective one of the mechanisms, the electric device for the pump mechanism being disposed within a first walled receptacle space, and the electric device for the valve mechanism being disposed within a second walled receptacle space;

the housing comprising plural housing parts that are in assembly relationship to enclose the pump and valve mechanisms within the housing; and a portion of the length of the flow path being defined cooperatively by an axially extending portion of the electric device for one of the mechanisms and an axially extending wall of the corresponding walled receptacle space.

6. A module as set forth in claim 5 in which the portion of the length of the flow path defined cooperatively by an axially extending portion of the electric device for one of the mechanisms and an axially extending wall of the corresponding walled receptacle space is defined cooperatively by an axially extending portion of the electric device for the valve mechanism and an axially extending wall of the first walled receptacle space.

7. A module as set forth in claim 6 in which the electric device for the valve mechanism comprises a solenoid.

8. A module as set forth in claim 5 including a sensor disposed within a third of the walled receptacle spaces and fluid-communicated to the flow path.

9. A module as set forth in claim 5 in which the electric device for the pump mechanism comprises an electric motor having a shaft axis and the electric device for the valve mechanism comprises a solenoid having an actuator axis, and further including an electric circuit board assembly, comprising electric circuitry, disposed within the housing, and electric circuit connections from the circuitry on the electric circuit board assembly to the electric motor and the solenoid assembly.

10. A module as set forth in claim 9 in which the shaft axis and the actuator axis are mutually parallel, and in which the electric circuit connections from the circuitry on the electric circuit board assembly to the electric motor and to the solenoid assembly comprise a lead frame assembly having an expanse that is transverse to shaft and actuator axes.

11. A module as set forth in claim 10 including an electric sensor disposed within a third walled receptacle space and fluid-communicated to the flow path, the sensor being electrically connected to the lead frame assembly.

12. A module as set forth in claim 9 in which the pump mechanism comprises an impeller pump, the electric motor is disposed in a first of the housing parts, and a second of the housing parts cooperates with the first housing part to enclose the impeller pump within a pumping chamber space of the housing.

13. A module as set forth in claim 12 in which the pumping chamber space comprises an outlet communicated to an entrance of the second walled receptacle space, the portion of the length of the flow path being defined cooperatively by an axially extending portion of the electric device for the valve mechanism and an axially extending wall of the second walled receptacle space.

14. An on-board evaporative emission leak detection module for detecting leakage from an evaporative emission space of a fuel system of an automotive vehicle, the module comprising:

a housing having an inlet port, an outlet port, a flow path extending between the inlet port and the outlet port, and plural walled receptacle spaces;

a selectively operable pump mechanism that is disposed in the flow path;

a selectively operable valve mechanism that is disposed in the flow path;

a respective electric device for operating a respective one of the mechanisms, the electric device for the pump mechanism being disposed within a first walled receptacle space, and the electric device for the valve mechanism being disposed within a second walled receptacle space;

the housing comprising plural housing parts that are in assembly relationship to enclose the pump and valve mechanisms within the housing;

a portion of the length of the flow path being defined cooperatively by a portion of the electric device for one of the mechanisms and a wall of the corresponding walled receptacle space;

the electric device for the pump mechanism comprising an electric motor having a shaft axis, and the electric device for the valve mechanism comprising a solenoid having an actuator axis, and further including an electric circuit board assembly, comprising electric circuitry, disposed within the housing, and electric circuit connections from the circuitry on the electric circuit board assembly to the electric motor and the solenoid assembly;

the pump mechanism comprising an impeller pump, the electric motor being disposed in a first of the housing parts, and a second of the housing parts cooperating with the first housing part to enclose the impeller pump within a pumping chamber space of the housing;

the pumping chamber space comprising an outlet communicated to an entrance of the second walled receptacle space, the portion of the length of the flow path being defined cooperatively by a portion of the electric device for the valve mechanism and a wall of the second walled receptacle space; and in which one of the housing parts comprises a wall of a casing of a vapor collection canister.

15. A module as set forth in claim 14 further including within the casing of the vapor collection canister, a medium that demarcates a clean air side of the canister from a dirty air side of the canister, the dirty air side of the canister being in common with the outlet port, and the clean air side of the canister being in common with the inlet port.

16. An on-board evaporative emission leak detection module for detecting leakage from an evaporative emission space of a fuel system of an automotive vehicle, the module comprising:

a housing comprising an inlet port, an outlet port, and a flow path extending from the inlet port to the outlet port;

the housing comprising an internal fuel vapor collection space containing a fuel vapor storage medium that is disposed within the housing to store fuel vapor in an internal region of the housing between a clean air segment of the flow path and a dirty air segment of the flow path;

a selectively operable pump for pumping gaseous fluid through the flow path in a pumping mode of operation;

a selectively operable valve for blocking flow through the flow path when in a blocking mode and for passing flow through the flow path when in a passing mode; and the dirty air segment of the flow path being in common with the outlet port, and the clean air segment of the flow path being in common with the inlet port.

17. A module as set forth in claim 16 in which the valve and the pump are disposed in the clean air segment of the flow path.

18. A module as set forth in claim 17 including a sensor having a sensing port communicating with the dirty air segment of the flow path.

19. An on-board evaporative emission leak detection module for detecting leakage from an evaporative emission space of a fuel system of an automotive vehicle, the module comprising:

a housing comprising an inlet port, an outlet port, and a flow path extending from the inlet port to the outlet port;

a medium that is disposed within the housing to demarcate a clean air segment of the flow path from a dirty air segment of the flow path;

a selectively operable pump for pumping gaseous fluid through the flow path in a pumping mode of operation;

a selectively operable valve for blocking flow through the flow path when in a blocking mode and for passing flow through the flow path when in a passing mode; and the dirty air segment of the flow path being in common with the outlet port, and the clean air segment of the flow path being in common with the inlet port; and in which the housing comprises a vapor collection canister whose interior contains the medium, the canister having a wall that cooperates with further housing parts to enclose the pump and valve within respective receptacle spaces that are external to the canister interior.

* * * * *